United States Patent [19]

Sapila

[11] 4,203,370
[45] May 20, 1980

[54] IN-FLOOR TOWLINE AUTOMATIC RE-ENTRY SPUR

[75] Inventor: Martin B. Sapila, Belle Mead, N.J.

[73] Assignee: Rapistan Incorporated, Grand Rapids, Mich.

[21] Appl. No.: 875,374

[22] Filed: Feb. 6, 1978

[51] Int. Cl.² .................... B60M 1/08; B61B 13/00
[52] U.S. Cl. ............................ 104/162; 104/172 BT
[58] Field of Search ........ 104/172 R, 172 C, 172 BT, 104/172 B, 88, 178, 162, 170; 214/730; 414/251

[56] References Cited

U.S. PATENT DOCUMENTS

| | | | |
|---|---|---|---|
| 3,024,741 | 3/1962 | Klamp | 104/172 BT |
| 3,027,850 | 4/1962 | Burrows | 104/172 BT |
| 3,045,609 | 7/1962 | Brown, Jr. | 104/88 |
| 3,048,126 | 8/1962 | Salapatas | 104/178 |
| 3,127,849 | 4/1964 | Klamp | 104/88 |
| 3,357,367 | 12/1967 | Etheridge et al. | 104/178 |
| 3,380,396 | 4/1968 | Willis | 104/172 BT |
| 3,538,854 | 11/1970 | Oranczak | 104/178 |
| 3,608,499 | 9/1971 | Krammer | 104/172 C |
| 3,822,646 | 7/1974 | Rosenberger, Jr. | 104/88 |
| 3,935,820 | 2/1976 | Lancaster | 104/88 |

FOREIGN PATENT DOCUMENTS 1241360  5/1961  Fed. Rep. of Germany.
6600298  7/1966  Netherlands.

Primary Examiner—Stephen G. Kunin
Assistant Examiner—Lawrence E. Williams
Attorney, Agent, or Firm—Price, Heneveld, Huizenga & Cooper

[57] ABSTRACT

An apparatus for transferring a towline cart of the type including a towpin from a non-powered spur line to a main in-floor line includes a housing positionable adjacent the spur line and having supported therein an elongated, flexible transfer member. The transfer member includes at least one pusher dog to engage the towpin of the towcart. A driven sprocket and endless chain is connected to the transfer member and a control system is provided for automatically extending the transfer member to transfer a towcart from the spur line to the main line and for retracting the transfer member back into the housing.

14 Claims, 5 Drawing Figures

IN-FLOOR TOWLINE AUTOMATIC RE-ENTRY SPUR

BACKGROUND OF THE INVENTION

The present invention relates to in-floor towline conveyors and more particularly to towline conveyors including a powered main line having a chain adapted to pull a truck or cart along the floor and one or more non-powered spur lines.

In-floor towline conveyors include a track or channel defining a slot and within which a powered chain rides. The powered chain includes a plurality of longitudinally spaced pusher dogs adapted to engage the towpin of the cart or truck in order to mechanically guide and pull the truck along the floor on a predetermined conveyor layout. Such systems will typically include one or more branch or spur lines at which carts or trucks may be accumulated for storage, loading or unloading purposes. If the spur is non-powered, the carts must be manually pushed back to the main line slot at which their respective towpins will re-engage a pusher dog of the main line conveyor chain.

Examples of in-floor towline conveyor systems may be found in U.S. Pat. No. 3,048,126 to Salapatas, entitled CONVEYOR INSTALLATION FOR WHEELED CARTS and issued on Aug. 7, 1962; U.S. Pat. No. 3,027,850 to Burrows, entitled CONVEYOR SYSTEMS and issued Apr. 30, 1962; U.S. Pat. No. 3,127,849 to Klamp entitled SUB-FLOORING CONVEYOR CONTROL SYSTEM and issued Apr. 7, 1964.

In the aforementioned Burrows patent, a system is disclosed for transferring a cart or truck from one powered line to another powered line of an in-floor towline conveyor. The transfer system or mechanism includes a hydraulically actuated ram. The ram engages the towpin of the cart to be transferred and pushes that cart between the powered lines. A ramp is provided at the entry point to raise the towpin of a cart to a position above the towline chain where it may drop into an empty pusher dog.

SUMMARY OF THE INVENTION

In accordance with the present invention a unique apparatus is provided for automatically transferring a cart or truck from a non-powered spur line to a powered main line. Essentially, the apparatus includes an elongated, flexible transfer member having at least one pusher dog positioned adjacent the spur line and movable within a track to a re-entry point on the main line. A drive means is provided for shifting the elongated flexible transfer member from a first "ready" or "start" position adjacent the spur line to a second position at which the cart re-enters the main line.

In narrower aspects of the invention, provision is made for sensing an empty pusher dog on the main line, actuating the drive means to transfer the cart to the main line, and sensing when the towpin of the transfer cart enters the empty pusher dog of the mainline conveyor to actuate the drive means and return the transfer member to its "ready" or "start" position.

DETAILED DESCRIPTION OF THE PREFERRED EMBODIMENT

Figure 1:
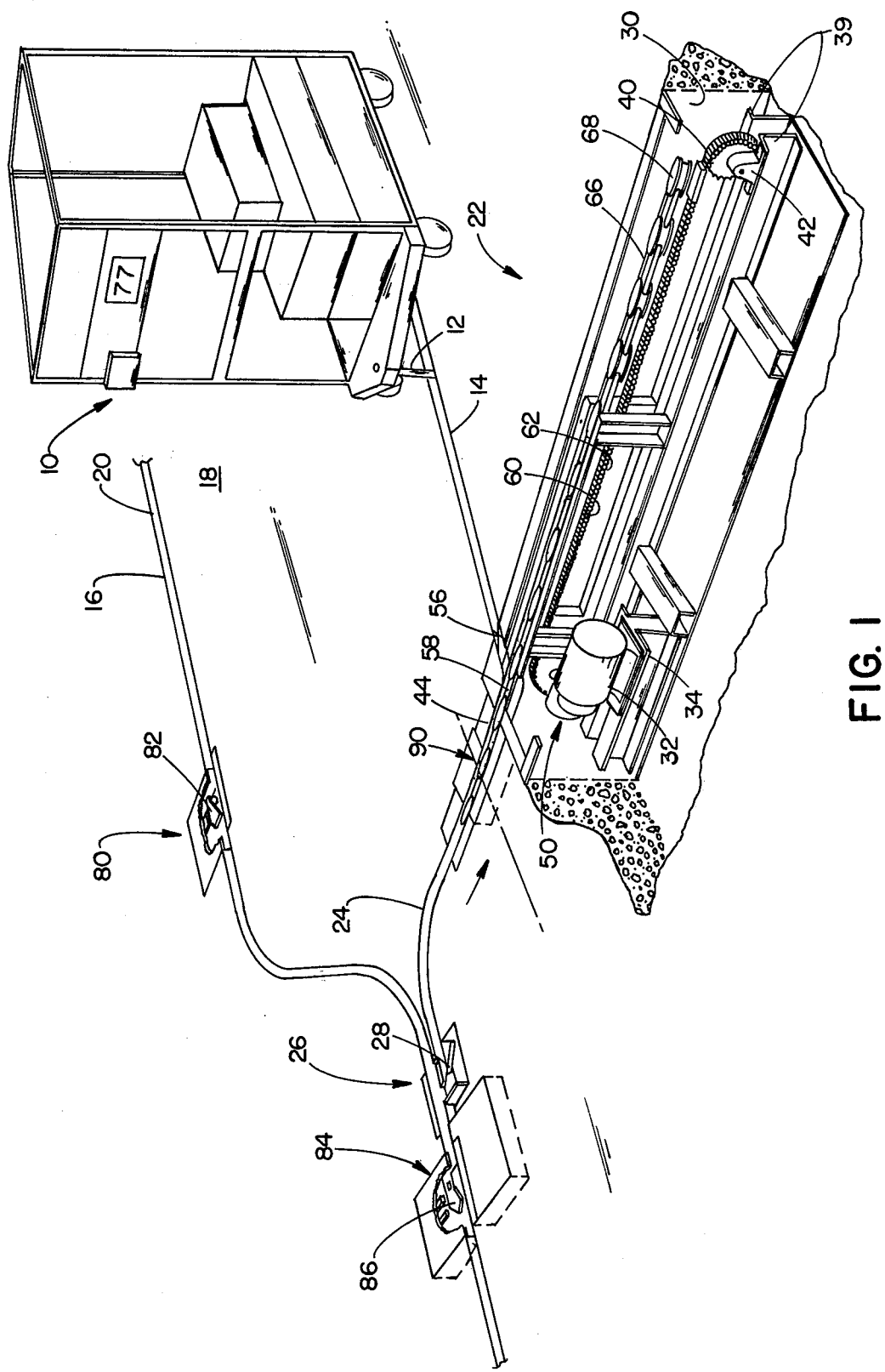
FIG. 1 is a fragmentary, perspective view of the unique In-Floor Towline Automatic Re-Entry Spur in accordance with the present invention.

With reference to the drawings, FIG. 1 illustrates the preferred embodiment of the in-floor towline automatic re-entry spur in accordance with the present invention. The present invention is adapted to automatically return a conventional towline cart 10 having a raisable towpin 12 from a non-powered or "dead" spur line 14 to a powered main line 16. The main line of the in-floor towline conveyor is of conventional construction and includes a generally channel shaped housing supported within the floor 18 of the warehouse space. A powered towline chain having a plurality of longitudinally spaced pusher dogs is propelled within the channel shaped member along a slot 20. The chain may, for example, be of the type disclosed in commonly owned U.S. Pat. No. 3,608,499 to Krammer and issued on Sept. 28, 1971. Towpins 12 of towline carts 10 ride within the slot 20 and are engaged by one of the pusher dogs so that each cart is propelled along the predetermined conveyor layout.

Positioned adjacent the end of the spur line 14 is a towline cart pusher assembly 22. Extending from the towline cart pusher assembly 22 to the main line 16 is a transfer channel 24. A conventional re-entry switch 26 having a re-entry ramp 28 transfers a towpin 12 from the transfer channel to the main line. The pusher assembly 22 propels tow cart 10 along the transfer channel 24 to the re-entry switch 28 where it enters the main towline chain.

Figure 3:
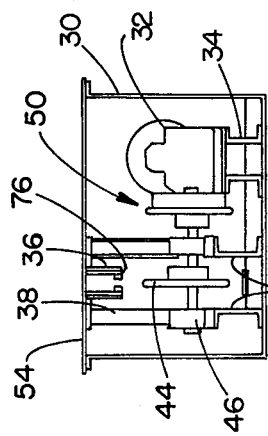
FIG. 3 is a cross-sectional view taken generally along line III—III of FIG. 2.
Figure 2:
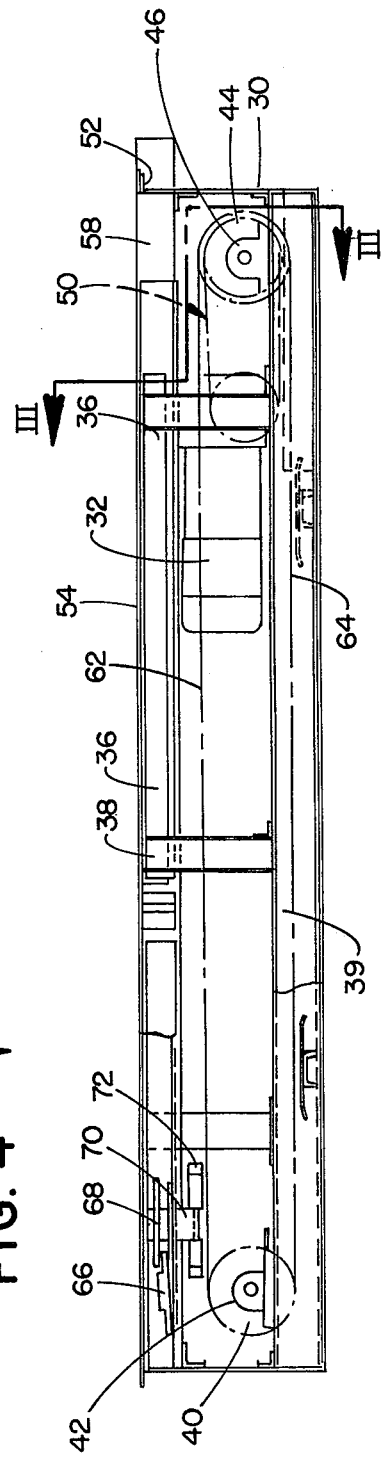
FIG. 2 is a side, elevational view partially in section of the towline cart pusher assembly included in the automatic re-entry spur in accordance with the present invention.

As best seen in FIGS. 1, 2 and 3, the towline cart pusher assembly 22 includes a housing 30 mounted below floor level. Positioned within the housing 30 is a driver motor 32 supported on a motor mount 34. An inverted, channel shaped member 36 is supported within the housing by angle brackets 38. The channel member 36 extends longitudinally within the housing and parallel to the housing sides. Extending the length of the housing on the bottom thereof are a pair of spaced, channel members 39. A sprocket 40 is rotatably supported by pillow block type bearings 42 adjacent one end of the channel members 39. Adjacent the opposite end of the channel supports 39 is another sprocket 44. Sprocket 44 is similarly supported by pillow block type bearings 46. The drive motor 32 is operatively connected to sprocket 44 by a chain drive 50 (FIG. 3). The housing 30 includes a peripheral lip 52 adapted to support a cover plate 54. A ramp 56 is disposed within the spur line 14 adjacent the housing 30. The ramp 56 causes the towpin 12 of the cart 10 to raise up and enter a slot 58 formed in the cover 54.

Extending around the sprockets 40, 44 is an elongated, endless flexible drive transmission member or roller chain 60. The chain 60 defines an upper run 62 and a lower run 64. Secured to the upper run 62 of the chain 60 is a flexible transfer member 66 including a pusher dog 90 adjacent one end. The transfer member 66 is preferably a length of towline chain of the type disclosed in the aforementioned U.S. Pat. No. 3,608,499.

An adapter link 68 including depending members 70 secures the transfer member 66 to the upper run 62 of the chain 60. The depending portions 70 of the adapter link 68 support a limit switch cam 72. A limit switch is positioned within the housing adjacent the forward and rearward ends of the upper run 62 of the chain. The limit switches are contacted by the cam plate 72 to control operation of the motor 32. The transfer member 66 rides within the inverted channel 36 and is guided thereby. Inwardly directed flange portions 76 of the channel 36 provide a track or guide surface upon which the transfer member rides. The forward wall of housing 30 is provided with an opening in-line with the channel 36 and the slot 58. The slot 58 is aligned with the transfer channel or track 24. As a result, operation of motor 32 extends and retracts the transfer member 66 from housing 30 along the transfer channel or track 24.

Positioned upstream of the re-entry switch 28 on the main line 16 is an empty pusher dog spotter 80. The pusher dog spotter 80 is of conventional design and includes a plate 82 positioned to ride along the sides of the towline chain and extend into an empty pusher dog to close a limit switch, as more fully explained below. Positioned downstream of the re-entry plate to the main line is a conventional towpin spotter mechanism 84. The towpin spotter mechanism similarly includes a plate 86. The plate 86 is positioned adjacent the main towline chain so as to actuate a limit switch, as explained below, when contacted by a towpin disposed within a pusher dog of the main tow chain.

After the necessary work has been performed at the spur line, an operator manually pushes the cart along the spur line 14. The towpin 12 of the cart rides up to the ramp 56 and rests on the flush top of the transfer member 60. The operator then pushes the cart towards the transfer channel 24 to deposit the towpin 12 within the pusher dog 90 at the load point. An automatic control system, described below, functions to activate the motor 32 causing the transfer member 66 to extend from the housing and push the cart 10 along the transfer channel 24 to the re-entry switch 26. The pusher dog 90 extends past ramp 28 and an angled cover plate 87 (FIG. 4) at switch 26 gradually transfers the towpin onto ramp 28 in a conventional fashion. The towpin 12 of the cart 10 will then be deposited within the slot 20 defined by the main line 16 at the re-entry point. When the empty dog sensed by the spotter 80 reaches the re-entry point, the towpin 12 will drop into the empty dog and actuate the towpin spotter 84. Actuation of the towpin spotter 84 reverses motor 32 and the transfer member 66 is retracted back into the housing 30 to its ready or start position.

Figure 4:
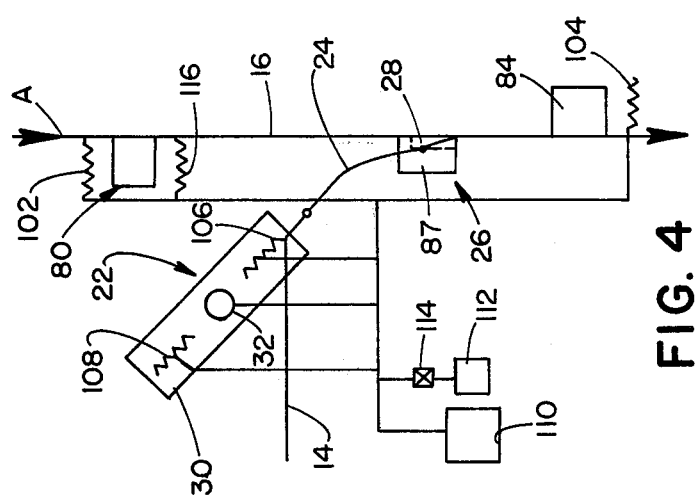
FIG. 4 is a schematic of the In-Floor Towline Automatic Re-Entry Spur.

The basic field wiring diagram of the control system incorporated in the present invention is illustrated in FIG. 4. The control system includes an empty pusher dog limit switch 102, a towpin spotter limit switch 104, activated by the towpin spotter blade 86, limit switches 106, 108 mounted within housing 30, a circuit logic panel 110, a motor starter 112 and a fused main, normally closed motor switch 114. It is presently preferred that a towpin spotter limit switch 116 as seen in FIG. 4, be positioned downstream of the empty pusher spotter limit switch 102. As explained below, limit switch 116 may be used to stop the drive means 32 in the event that the empty pusher spotter incorrectly indicates the presence of an empty pusher dog. Also, the limit switch 116 may be used to shut down the main line tow chain to prevent a collision at re-entry switch 26 in the event the cart to be transferred does not properly deposit the towpin in the empty pusher dog.

Figure 5:
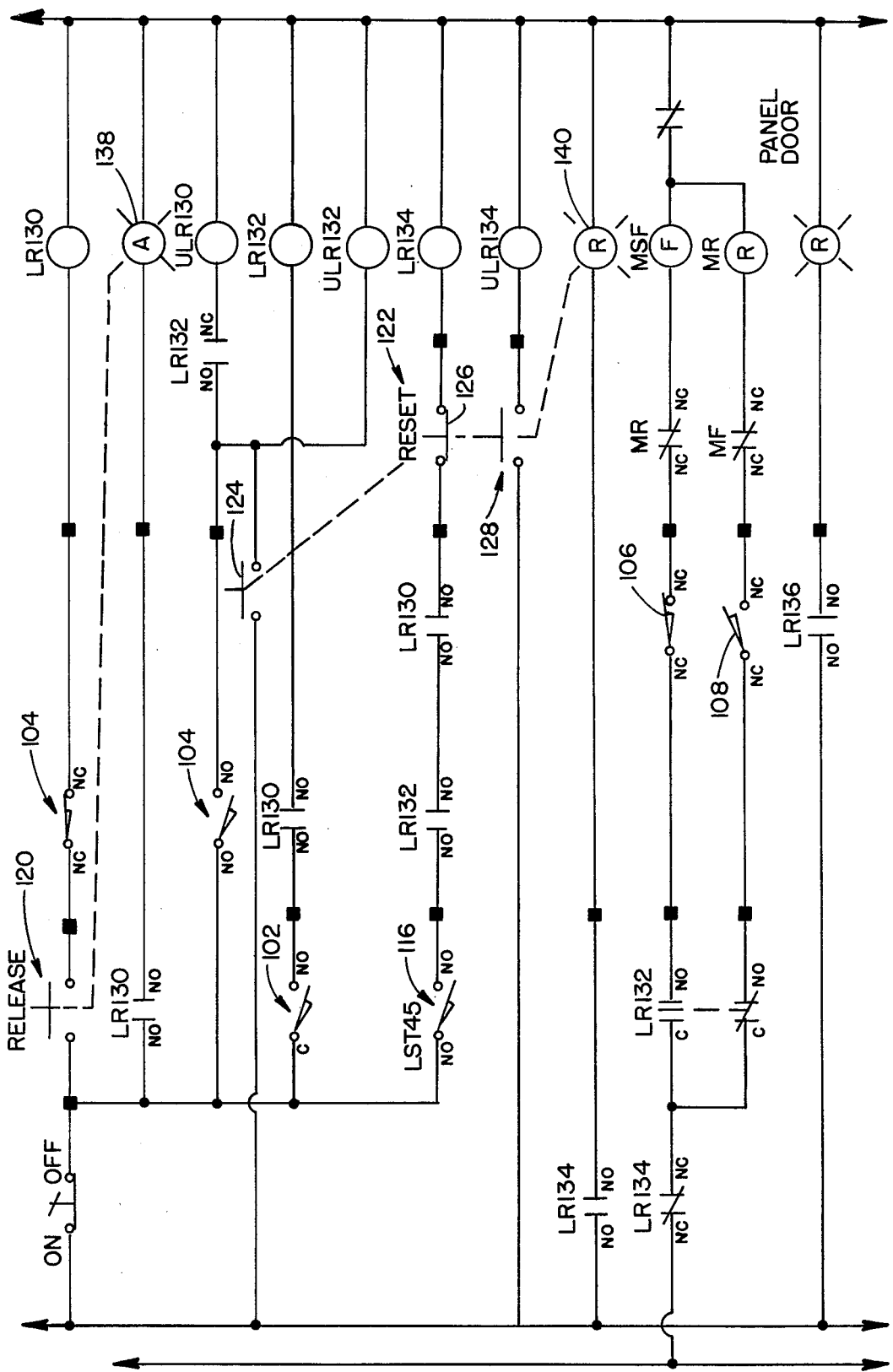
FIG. 5 is a schematic of the control system.

The hard wired control logic circuit is schematically illustrated in FIG. 5. The circuit includes a release or send switch 120 located on an operator control panel positioned adjacent the re-entry spur. The control circuit further includes a re-set switch 122 having contacts 124, 126, and 128 and latched relays 130, 132, and 134 each of which includes the schematically illustrated latching and unlatching coils and multiple contacts. Further, the system includes motor starters MSF, MSR and motor switches MR, MF. The control also includes a "send" indicator light 138 and a re-set indicator light 140.

In a presently existing embodiment of the present invention, the total travel of the upper run of the chain 66 is approximately 6 feet, 2 inches with 3.75 inches pre-travel required to compress the chain. A total travel of 70.25 inches is required to transfer the cart from the load point defined by the pusher dog 90 when in its ready position to the main line 16. The transfer member or chain 66 has a length from the center of the adapter link to the center of the pusher dog of approximately 89 and ⅜ inches extended and 85 and ⅝ inches compressed. The chain will therefore expand and travel past the up ramp 28 of the re-entry switch 26 to insure that the cart is transferred to the main line 16. The distance from the load point to the re-entry point defined by the re-entry switch 28 is approximately 80 and ¼ inches. The latching relays of the control system and the empty pusher dog spotters and towpin spotters are commercially and readily available items.

OPERATION

When the loading or unloading of the tow cart 10 disposed within the spur line 14 has been completed, the operator will manually move the cart along the spur line 14 up the ramp 56 and position the towpin 12 within the transfer member pusher dog 90. The re-entry dog 90 is in its ready or rearward most position as illustrated in FIG. 1. Limit switch 108 is open and limit switch 106 is closed. The operator then returns to the control panel and pushes the release button 120 thereby latching relay 130. Latching of relay 130 results in activation of indicator light 138, arming of the empty dog spotter limit switch 102 and partial arming of back-up limit switch 116 of the towpin spotter positioned immediately adjacent and downstream of the empty pusher spotter 80 (FIG. 4). Limit switch 102 is momentarily closed when an empty pusher dog on the main conveyor chain passes thereby. Of course, the spaces between the limit switch 102 of the empty pusher spotter 80 and the re-entry switch 28 and between the ready position of the tow cart on the re-entry spur transfer member and the re-entry point would be identical if the re-entry conveyor is traveling at the same speed as the main conveyor.

When an empty dog is spotted at limit switch 102, it closes latching relay 132. This effectively closes contacts 132 in the forward motor circuit and opens contacts 132 in the reverse motor circuit, thereby, activating the motor 32 and moving the cart toward the reentry point defined by the reentry switch 26 (the limit switch 106 is normally closed). Limit switch 116 is provided as a safety factor. If for some reason limit switch 102 is improperly activated, the sensing of a towpin in the theretofore supposed "empty" pusher dog by limit switch 116 latches relay 134. This normally opens normally closed contacts 134 removing power from the motor circuit and closing normally open contacts 134 to activate either a light or other enunciator. The operator will then remove the towpin from the pusher dog on the re-entry spur and reset the circuit through actuation of a re-set button 122. It is also presently preferred that the latching relay 134 activate a set of normally closed contacts to shut off power to the main line conveyor. Limit switch 116 will therefore prevent a collision at the re-entry point defined by re-entry switch 28 should the towpin of a cart being transferred fail to engage the empty pusher dog of the main line conveyor sensed by limit switch 102.

Assuming that the light switch 116 has not been activated and that the limit switch 102 has correctly sensed an empty pusher dog in the main conveyor, the motor 32 will continue to rotate sprocket 44 driving the transfer member 66 forwardly until the limit switch cam 72 on the adapter 68 contacts limit switch 106. Opening of limit switch 106 removes power from the motor 32 since the forward side of the line is opened at limit switch 106 and the reverse side of the line is open at normally closed contacts 132 because relay 132 is still latched.

The tow cart, almost simultaneously, is picked up by the empty dog on the main conveyor line and entered into that main line traffic stream. The re-entry spur motor 32 remains inactivated, however, until the presence of the cart on the main line is positively sensed by limit switch 104 of the towpin spotter 84. Limit switch 104 will close when it senses the presence of a towpin in the main conveyor dog, thereby unlatching relays 130, 132. The unlatching of relay 132 causes normally closed contact 132 in the reverse motor circuit to close, thereby activating motor 32 in the reverse direction. The transfer member 60 including pusher dog 90 will move rearwardly or retract back into the housing 30 until the limit switch cam 72 engages limit switch 108 opening the circuit and removing power from the system. At this point, the entire cycle can be repeated and another tow cart may be automatically entered into the main line traffic stream.

As should now be readily apparent to those of ordinary skill in the art, the unique in-floor towline automatic re-entry spur in accordance with the present invention is relatively easily and inexpensively manufactured and is readily adaptable to existing or new towline conveyor systems. The control systems functions effectively and safely to automatically transfer a cart whose towpin has been placed within the pusher dog 90 along the transfer channel 24 to the main line 16. In view of the foregoing description, however, various modifications will undoubtedly now become apparent to those of ordinary skill in the art and which would not depart from the inventive concepts disclosed herein. For example, the sprocket and chain drive of the pusher assembly 22 could be replaced by a pully and drive belt arrangement. Therefore, it is expressly intended that the above description should be considered only that of the preferred embodiment. The true spirit and scope of the present invention will be determined by reference to the appended claims.

The embodiments of the invention in which an exclusive property or privilege is claimed are defined as follows.

1. An apparatus for use in an in-floor towline conveyor system of the type including a main line having a driven towline chain, a plurality of carts each including a towpin engageable by said towline chain, and at least one non-powered spur line, said apparatus transferring a cart from the spur line to said main line and comprising:
   a housing positionable adjacent said spur line;
   an inverted channel-shaped member supported longitudinally within said housing;
   an elongated, flexible, extendable and compressible transfer member supported within said housing for guided longitudinal, reciprocating movement by being disposed within said inverted channel-shaped member, said member being shiftable from a first towpin receiving position to a second towpin transfer position to push a cart to the mainline, said transfer member extending from a compressed condition at said second position; and
   drive means operatively connected to said member for shifting said member between said first and second positions.

2. An apparatus as defined by claim 1 wherein said drive means comprises:
   a pair of longitudinally spaced sprockets; and
   a flexible drive transmission member connecting said sprockets, said transfer member being connected to said drive transmission member.

3. An apparatus as defined by claim 2 further including a drive motor operatively connected to one of said sprockets for rotating said one sprocket.

4. An apparatus as defined by claim 2 wherein said elongated flexible transfer member comprises a towline chain having an extended length greater than a compressed length to insure transfer of a cart and wherein said transfer member includes at least one pusher dog for engaging a towpin of a cart.

5. An apparatus for returning an in-floor towline cart of the type having a towpin from a non-powered spur to a main line, comprising:
   a housing adapted to be positioned adjacent the non-powered spur;
   a pair of sprockets rotatably supported within said housing in spaced relationship and in the same plane;
   a transfer channel aligned with said housing and dimensioned to extend to the main line;
   an endless flexible drive transmission member extending around said sprockets to define a first run and second run;
   a length of towline chain including at least one pusher dog at one end, the end of said chain opposite said pusher dog being secured to the first run of said drive transmission member, said length of chain extending into said transfer channel; and
   drive means operably connected to one of said sprockets for rotating said sprockets whereby said towline chain is movable out of said housing and within said transfer channel to move and transfer a towcart whose towpin is received in said pusher dog to a main line in-floor towline conveyor.

6. An apparatus as defined by claim 5 further including control means for automatically actuating said drive means to cause said length of towline chain to extend out of said housing and within said transfer channel towards said main line to transfer a cart and to retract back into said housing along said transfer channel in response to engagement of the cart on the main line.

7. An apparatus as defined by claim 6 wherein said flexible drive transmission comprises a chain.

8. A system for transferring a towline cart of the type including a towpin from a non-powered spur line to a main line of an in-floor towline conveyor, said main line including a powered towline chain having a plurality of longitudinally spaced pusher dogs, said system comprising:

a main line re-entry switch positioned adjacent said main line;

a transfer channel extending from said spur line to said re-entry switch at said main line;

empty pusher dog spotter means positioned adjacent said main line upstream of said re-entry switch for spotting an empty pusher dog and generating a signal in response thereto;

transfer means positioned adjacent said spur line and including a flexible, extendable and compressible transfer member having ends, said transfer means being engageable with a cart towpin and movable between a first position adjacent said spur line to a second position adjacent said main line for transferring a towcart from said spur line along said transfer channel to said main line re-entry switch in response to the empty pusher dog signal generated by said spotter means; and a towpin spotter means positioned adjacent said main line downstream of said re-entry point of said main line for sensing receipt of the towpin of said transferred cart in a main line pusher dog and generating a signal in response thereto indicating that the cart has been transferred to said main line and causing return of said transfer member to said first position.

9. A system as defined by claim 8 wherein said transfer member is a flexible length of towline chain having a pusher dog for receipt of the towpin of the cart to be transferred, said pusher dog being shiftable from said first position adjacent said spur line to said second position adjacent said main line.

10. A system as defined by claim 9 wherein said re-entry switch includes a re-entry ramp at the point where said transfer channel extends to said main line for raising the towpin of said transferred cart out of engagement with said transfer member pusher dog.

11. A system as defined by claim 9 wherein said transfer means further includes:

a housing supporting an inverted channel member within which said transfer member rides;

a pair of longitudinally spaced sprockets rotatably supported within said housing; and an endless flexible drive transmission member connecting said sprockets and defining an upper run and a lower run, said transfer member being operatively connected to said upper run by an adapter link, said adapter link having a limit switch cam.

12. A system as defined by claim 11 further including drive means operatively connected to one of said sprockets for shifting said transfer member from said first position to said second position and back to said second position.

13. A system as defined by claim 12 further including a limit switch operatively engaged by said adapter link limit switch cam when said pusher dog is in said second position for stopping said drive means.

14. A system as defined by claim 13 further including another limit switch operatively engaged by said transfer member when said pusher dog returns to said first position in response to the signal generated by said towpin spotter for stopping said drive means.

* * * * *